United States Patent [19]
Van Voorhies

[11] Patent Number: 5,984,349
[45] Date of Patent: *Nov. 16, 1999

[54] LOW PROFILE HYDRAULIC SEAT WEIGHT SENSOR

[75] Inventor: Kurt L. Van Voorhies, DeTour Village, Mich.

[73] Assignee: Automotive Systems Laboratory, Inc., Farmington Hills, Mich.

[ * ] Notice: This patent is subject to a terminal disclaimer.

[21] Appl. No.: 09/003,744

[22] Filed: Jan. 7, 1998

Related U.S. Application Data

[60] Provisional application No. 60/065,832, Nov. 17, 1997.

[51] Int. Cl.⁶ .................................................. B60R 21/32
[52] U.S. Cl. ........................ 280/735; 297/217.2; 340/667
[58] Field of Search ............................. 180/273; 280/735, 280/732, 730.1; 340/667, 666; 297/217.2

[56] References Cited

U.S. PATENT DOCUMENTS

| | | | |
|---|---|---|---|
| 1,232,983 | 7/1917 | Schenk | 177/254 |
| 3,889,529 | 6/1975 | Bradley | 73/141 R |
| 3,992,946 | 11/1976 | Bradley | 73/407 |
| 4,022,146 | 5/1977 | Sadler | 340/278 |
| 4,056,156 | 11/1977 | Dayton | 177/209 |
| 4,219,090 | 8/1980 | Dayton | 177/208 |
| 4,360,071 | 11/1982 | Dyck | 177/208 |
| 4,383,584 | 5/1983 | Dyck | 177/208 |
| 4,456,084 | 6/1984 | Miller | 177/141 |
| 4,957,286 | 9/1990 | Persons, II et al. | 272/73 |
| 4,987,898 | 1/1991 | Sones | 128/645 |
| 5,117,373 | 5/1992 | Huff | 364/550 |
| 5,430,275 | 7/1995 | Braunisch | 219/708 |
| 5,606,516 | 2/1997 | Douglas et al. | 364/571.04 |

*Primary Examiner*—Paul N. Dickson
*Assistant Examiner*—Lynda Jasmin
*Attorney, Agent, or Firm*—Lyon, P.C.

[57] ABSTRACT

A hydrostatic weight sensor comprises one or more fluid containing bladders in fluid communication with one another and with a pressure sensor, each constructed from a plurality of sheets of semi-rigid material sealably connected at the periphery thereof so as to form one or more enclosed volumes, and filled with a fluid so as to cause deformation of the bladder faces. The hydrostatic weight sensor is located within the seat, and the pressure of the fluid contained therein is responsive to the applied load. In another embodiment, a plurality of sheets of semi-rigid material are sealed at a periphery and are secured to one another at a plurality of locations within the periphery so as to create a plurality of fluid containing zones which can hinge with respect to one another. The sensing fluid is either a liquid, a Bingham plastic, or a thixotropic material.

21 Claims, 4 Drawing Sheets

LOW PROFILE HYDRAULIC SEAT WEIGHT SENSOR

CROSS-REFERENCE TO RELATED APPLICATIONS

The instant application claims the benefit of U.S. Provisional Application Ser. No. 60/065,832 filed on Nov. 17, 1997.

Co-pending U.S. application Ser. No. 08/933,701, hereinafter "Application ASL-157-US", entitled "Seat Weight Sensor Having Fluid Filled Bladder", filed on Dec. 18, 1997 claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL-157-US also discloses a load distributor for distributing loads across the load bearing surface of the hydrostatic weight sensor.

Co-pending U.S. application Ser. No. 09/033,672, hereinafter "Application ASL-161-US", entitled "Automotive Seat Weight Sensing System", filed on Jan. 7, 1998 claiming benefit of U.S. Provisional Application Ser. No. 60/034,018 filed on Jan. 8, 1998, and assigned to the assignee of the instant invention discloses a seat weight sensing system comprising a plurality of hydrostatic weight sensors each of which is in accordance with Application ASL-157-US.

Co-pending U.S. application Ser. No. 09/003,870, hereinafter "Application ASL-163-US", entitled "Vehicle Seat Sensor Having Self-Maintaining Air Bladder", filed on Jan. 7, 1997 claiming benefit of U.S. Provisional Application Ser. No. 60/035,343 filed on Jan. 16, 1997, and assigned to the assignee of the instant invention discloses an apparatus for automatically maintaining the supply of sensing fluid in a hydrostatic weight sensor.

Co-pending U.S. application Ser. No. 09/033,851, hereinafter "Application ASL-185-US", entitled "Seat Weight Sensor Having Self-Regulating Fluid Filled Bladder", filed on Jan. 7, 1998 claiming benefit of U.S. Provisional Application Ser. No. 60/058,086 filed on Sep. 5, 1997, and assigned to the assignee of the instant invention discloses a hydrostatic weight sensor having a means for automatically regulating the amount of sensing fluid therein.

Co-pending U.S. application Ser. No. 09/003,868, hereinafter "Application ASL-186-US", entitled "Seat Weight Sensor with Means for Distributing Loads", filed on Jan. 7, 1998 claiming benefit of U.S. Provisional Application Ser. No. 60/058,084 filed on Sep. 5, 1997, and assigned to the assignee of the instant invention discloses a load distributor for distributing sensed load across the load bearing surface of a hydrostatic weight sensor.

Co-pending U.S. application Ser. No. 09/003,673, hereinafter "Application ASL-187-US", entitled "Seat Weight Sensor Having Self-Regulating Fluid Filled Bladder", filed on Jan. 7, 1998 claiming benefit of U.S. Provisional Application Ser. No. 60/058,119 filed on Sep. 5, 1997, and assigned to the assignee of the instant invention discloses a hydrostatic weight sensor having a means for automatically regulating the amount of sensing fluid therein.

Co-pending U.S. application Ser. No. 09/003,850, hereinafter "Application ASL-193-US", entitled "Altitude/Temperature Compensation for a Gas-Filled Weight Sensor", filed on Jan. 7, 1998 claiming benefit of U.S Provisional Application Ser. No. 60/065,334 filed on Nov. 13, 1997, and assigned to the assignee of the instant invention discloses a hydrostatic weight sensor comprising a pair of hydrostatic weight sensors in series with one another but having a different sensitivity with respect to variations in temperature or ambient pressure.

Co-pending U.S. application Ser. No. 09/003,746, hereinafter "Application ASL-194-US", entitled "Seat Weight Sensor Using Fluid Filled Tubing", filed on Jan. 7, 1998 claiming benefit of U.S. Provisional Application Ser. No. 60/065,986 filed on Nov. 17, 1997, and assigned to the assignee of the instant invention discloses a hydrostatic weight sensor incorporating a fluid filled tube.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail bones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline fully forward. Moreover, the sensing aperture of these sensors may become occluded by inadvertent scratching or substance application.

Known seat weight sensing techniques generally require multiple points for sensing distributed weight accurately. Also, force sensing resistors, load cells or membrane switches may require significant seat redesign for use in current or future seats. This is particularly true for spring type seats which do not provide a uniform horizontal support surface. The response time of load cells or membrane switches may fast enough for realtime applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the sensor bladder must be sufficiently thick to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

The instant invention overcomes the above noted problems by providing a low profile hydraulic hydrostatic weight sensor constructed from a pair plates or sheets of semi-rigid material which is peripherally sealed to form a sealed area. The sealed area is in fluid communication with a sensing port. A sensing fluid is injected into the sealed area causing the planar walls of the sealed area to bulge outwardly thereby forming a sealed cavity. The sensing fluid is preferably either a liquid, grease, Bingham fluid, or a thixotropic material, preferably with a relatively small thermal expansion coefficient and retaining fluid-like properties over the range of temperatures which can be encountered in an automotive environment. A differential pressure transducer in fluid communication with the sensing fluid via the sensing port senses the pressure differential between the sensing fluid and the surrounding environment.

The above described hydraulic hydrostatic weight sensor is embedded within the seat, preferably below the seat cushion and above the seat springs. In operation, a load applied to the seat is transferred to the top of the hydraulic hydrostatic weight sensor via the seat cushion and reacted by the seat springs against the bottom of the hydraulic hydrostatic weight sensor, thereby causing the top and bottom surfaces of the hydraulic hydrostatic weight sensor to be compressed, compressing the sensing fluid of the hydraulic hydrostatic weight sensor. The pressure of the sensing fluid transfers the load from the top surface of the hydraulic hydrostatic weight sensor to the bottom surface thereof. Therefore, assuming that the arrangement of the hydraulic hydrostatic weight sensor within the seat is such that all of the load on the seat is supported by the hydraulic hydrostatic weight sensor, then the magnitude of the applied load is substantially given by the product of the sensor fluid pressure times the area of the bottom surface of the hydraulic hydrostatic weight sensor exposed to the sensing fluid.

One problem with a hydraulic hydrostatic weight sensor constructed with a semi-rigid material forming a single cavity is that the resulting assembly is relatively inflexible, especially in comparison with the flexibility of the associated seat spring. Such a hydraulic hydrostatic weight sensor when incorporated into a seat assembly could possibly reduce the seating comfort as perceived by a seated occupant because a relatively inflexible hydraulic hydrostatic weight sensor could decrease the overall flexibility of the seat. Alternately, the flexing of such a relatively inflexible hydraulic hydrostatic weight sensor by the motion of the seat cushion responsive to a seated occupant could result in a premature failure of the hydraulic hydrostatic weight sensor, for example due to fatigue and localized stress risers.

A second embodiment of the instant invention provides for a hydraulic hydrostatic weight sensor with increased flexibility of by incorporating into a single assembly a plurality of relatively small single cell embodiments which are in fluid communication with one another, whereby the interconnections between the separate cells are sufficiently flexible so as to enable the entire assembly to conform to the deflections of the seat cushion or seat spring. The multi-cell embodiment may be constructed as an assemblage of distinct single cells. Alternately the multi-cell embodiment may comprise a unitary construction incorporating a continuous sheet or plate for each of the top and bottom surfaces of the hydraulic hydrostatic weight sensor, whereby the assembly is partitioned into a plurality of cells with seams or tufts by which the cells adjacent thereto may hinge and which are arranged to provide for fluid communication amongst the cells.

By incorporating a Bingham fluid or a thixotropic material as the sensing fluid, the instant invention is substantially not responsive to the orientation of the hydraulic hydrostatic weight sensor, so that the differential pressure signal resulting from an applied load is primarily responsive to the magnitude of the load.

By incorporating a semi-rigid material in the top and bottom surfaces of the hydraulic hydrostatic weight sensor and a liquid, grease, Bingham fluid, or thixotropic material as the sensing medium, the instant invention is less susceptible to the top surface bottoming out against the bottom surface as can occur with a more compressible sensing medium such as a gas, or if the top and bottom surfaces of the load cell are relatively flexible. Moreover, the instant invention does not require a means for automatically maintaining the load cell in a partially filled state because the sensing fluid is relatively incompressible, relatively viscous, and relatively insensitive to temperature and ambient pressure variations. Furthermore, the instant invention is less susceptible to leakage than a pneumatic weight sensor because the top and bottom surfaces can be constructed from a relatively impermeable material such as steel. Furthermore, by incorporating a sensing fluid which is relatively incompressible and relatively insensitive to temperature and ambient pressure variations, the instant invention can be constructed with a relatively low profile since only a relatively small volume of sensing fluid is required.

The instant invention provides a seat weight sensor which can be constructed relatively inexpensively and ruggedly from steel stampings which are welded to form the associated cells. The cells are then shaped by filling with an appropriate sensing fluid under pressure. Thereafter, the cells retain their deformed shape, which without the sensing fluid contained therein is relatively compliant under compressive loads applied to the faces of the cells. A unitary constructed multi-cell embodiment may alternately incorporate spring steel stampings thereby enabling the hydraulic hydrostatic weight sensor to also fimction as a seat spring.

Accordingly, one object of the instant invention is to provide an improved seat weight sensor which provides a consistent and accurate measure of the seat loading independent of the location of the source of weight on the seat.

A further object of the instant invention is to provide an improved seat weight sensor which provides a consistent and accurate measure of the seat loading independent of the size and distribution of the source of weight on the seat.

A yet further object of the instant invention is to provide an improved seat weight sensor which provides a consistent and accurate measure of the seat loading independent of the amount of weight on the seat.

A yet further object of the instant invention is to provide an improved seat weight sensor which operates over a wide range of ambient temperature and pressure conditions.

A yet further object of the instant invention is to provide an improved seat weight sensor which can distinguish between a rear facing infant seat, for which an air bag system is preferably not deployed, and other occupants for which an air bag system is preferably deployed in the event of a crash of sufficient severity.

A yet further object of the instant invention is to provide an improved seat weight sensor which can be incorporated into an intelligent safety restraint system for which the preferable mode of the activation of a controllable occupant restraint system is dependent upon the weight of the occupant.

A yet further object of the instant invention is to provide an improved seat weight sensor which does not interfere with occupant comfort.

A yet further object of the instant invention is to provide an improved seat weight sensor which is insensitive to the orientation of the seat.

A yet further object of the instant invention is to provide an improved seat weight sensor which is inexpensive to produce.

In accordance with these objectives, one feature of the instant invention is a low profile hydraulic hydrostatic weight sensor mounted in the seat.

Another feature of the instant invention is a pressure sensor operatively coupled to the hydraulic hydrostatic weight sensor for measuring the pressure therein.

Yet another feature of the instant invention is a differential pressure sensor operatively coupled to the hydraulic hydrostatic weight sensor for measuring the pressure therein relative to local atmospheric pressure.

Yet another feature of the instant invention is the incorporation of the hydraulic hydrostatic weight sensor below the seat cushion wherein the seat cushion acts to distribute the seat load across the surface of the hydraulic hydrostatic weight sensor.

Yet another feature of the instant invention is the incorporation of sheets or plates of semi-rigid material sealably connected to form a sealed area which is in fluid communication with a sensing port.

Yet another feature of the instant invention is the incorporation of a plurality of hydraulic hydrostatic weight sensor elements each of which incorporates sheets or plates of semi-rigid material sealably connected to form an associated sealed area, whereby all of the associated sealed areas are in fluid communication with one another and with a sensing port.

Yet another feature of the instant invention is the incorporation of sheets or plates of semi-rigid material which are sealably connected to form one or more sealed areas which are in fluid communication with one another and with a sensing port.

Yet another feature of the instant invention is the incorporation of a liquid, grease, Bingham fluid or thixotropic material as the sensing fluid, whereby upon assembly of the hydraulic hydrostatic weight sensor, the sensing fluid is injected therein thereby causing the sealed area or areas thereof to bulge outwardly causing the sides of the sealed area to bulge outwardly forming associated one or more sealed cavities.

The specific features of the instant invention provide a number of associated advantages. One advantage of the instant invention with respect to the prior art is that the hydraulic hydrostatic weight sensor is responsive to loads over a large area of the seat without regards to the distribution or amount of loading.

Another advantage of the instant invention is that the hydraulic hydrostatic weight sensor is relatively insensitive to variations in ambient pressure or temperature so that the seat weight sensor works consistently and accurately over a wide range of ambient pressures and temperatures.

Yet another advantage of the instant invention is that through the incorporation of a grease, Bingham fluid or thixotropic material as a sensing fluid, which in the hydraulic hydrostatic weight sensor does not exhibit a substantial hydrostatic head, the associated differential pressure measurement is relatively insensitive to the orientation of the seat.

Yet another advantage of the instant invention is that through the incorporation of sheets or plates of semi-rigid material in the surfaces of the hydraulic hydrostatic weight sensor, the instant invention is relatively insensitive to localized loading which could otherwise cause the top surface to bottom out against the bottom surface, thereby creating an alternate load path which bypasses the sensing fluid.

Yet another advantage of the instant invention is that through the incorporation of sheets or plates of semi-rigid material in the surfaces of the hydraulic hydrostatic weight sensor, and the incorporation of a liquid, grease, Bingham fluid or thixotropic material as a sensing fluid, the instant invention is relatively inexpensive to produce.

Yet another advantage of the instant invention is that through the incorporation of spring steel in the surfaces of the hydraulic hydrostatic weight sensor, the instant invention can also function as a seat spring.

Yet another advantage of the instant invention is that the seat weight sensor thereof can enable a rear facing infant seat to be distinguished from an occupant for which the air bag system is preferably deployed.

Yet another advantage of the instant invention is that the seat weight sensor thereof is sufficiently robust and accurate to enable associated occupant weight dependent control of a controllable occupant restraint system.

Accordingly, the instant invention provides an improved seat weight sensor which is relatively insensitive to the effects of ambient temperature and pressure; which is simple in construction and relatively robust and reliable in operation; which has a low physical profile and which can be readily incorporated into an automotive seat without interfering with occupant comfort; and which can be produced relatively inexpensively.

These and other objects, features and advantages of the instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

DETAILED DESCRIPTION OF THE PREFERRED EMBODIMENT(S)

Figure 1:
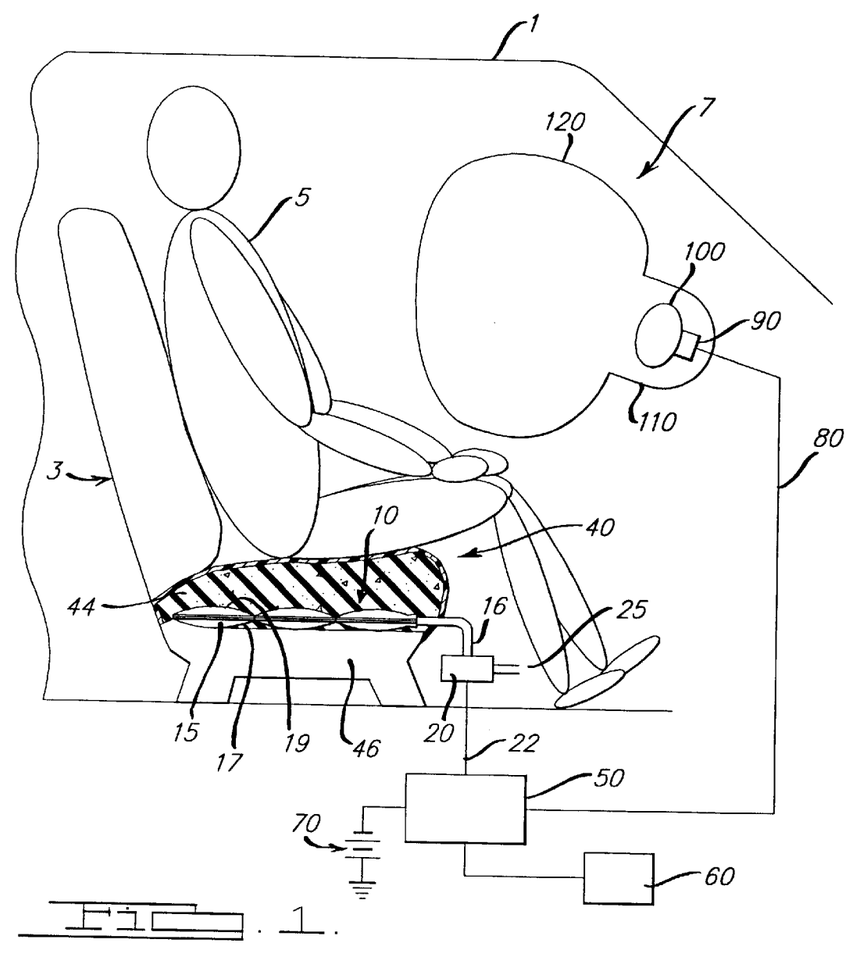
FIG. 1 illustrates one possible environment of the instant invention.

Referring to FIG. 1, a seat 3 in a motor vehicle 1 incorporates a hydraulic hydrostatic weight sensor 10 mounted in the seat base 40. The hydraulic hydrostatic weight sensor 10 comprises hydraulic load cell element 15, or bladder, and a differential pressure sensor 20 for measuring the difference in pressure between the hydraulic load cell element and the atmosphere 25. The hydraulic load cell element 15 is sandwiched between the seat frame 46 below and the seat cushion foam 44 above.

In operation, an occupant 5 seated on the base 40 of seat 3 causes the pressure inside the hydraulic load cell element 15 to increase such that that product of the differential pressure, as sensed by differential pressure sensor 20, multiplied times the area of the base 17 of the hydraulic load cell element 15 is substantially equal to the total weight distributed by the seat cushion foam 44 over the top 19 of the hydraulic load cell element 15. The pressure signal output 22 from differential pressure sensor 20 is operatively coupled to a signal processor 50 which converts the pressure signal output 22 to a measure of occupant weight using known analog, digital, or microprocessor circuitry and software. A crash sensor 60 is also operatively coupled to the signal processor 50. Responsive to a crash detected by the crash sensor 60, and further responsive to the sensed weight of the occupant as transformed from the pressure signal output 22, the signal processor 50 generates a signal 80 which is operatively coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Figure 2:
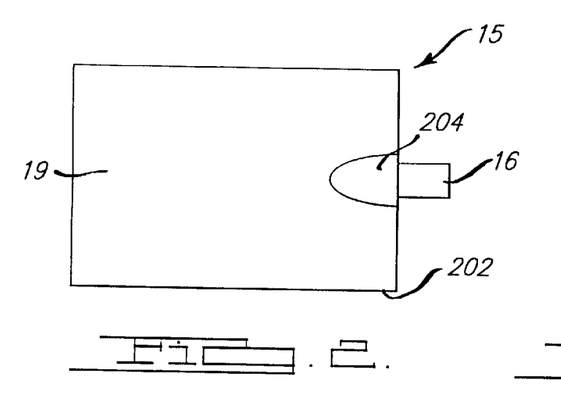
FIG. 2 illustrates a plan view of a single cell embodiment of the instant invention.
Figure 3A:
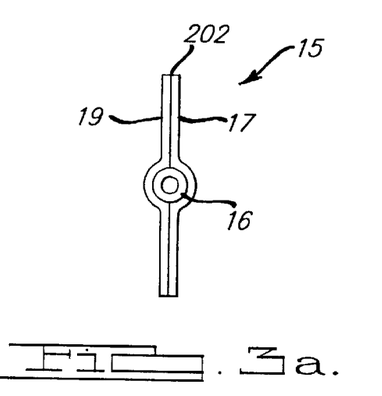
FIG. 3a illustrates an end view of a single cell embodiment of the instant invention prior to filling with fluid.
Figures 3B, 4A, 4B, 5:
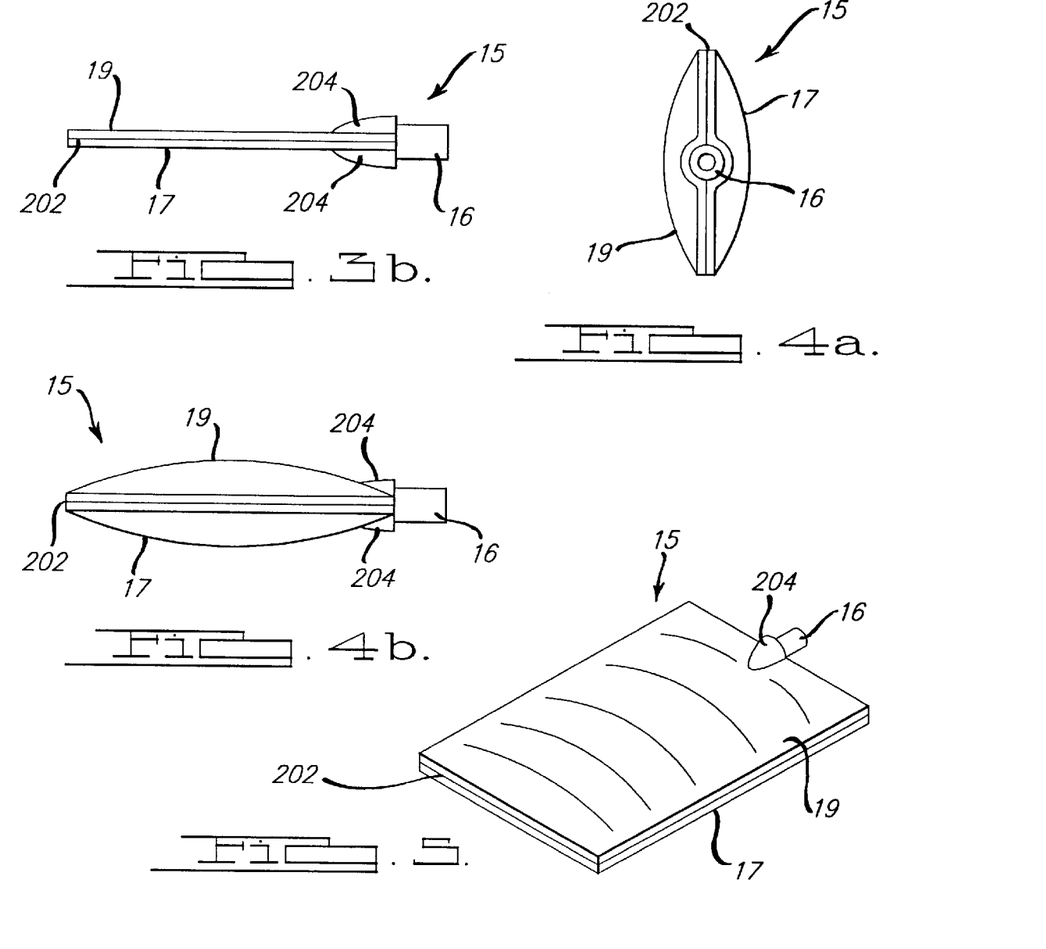
FIG. 3b illustrates a side view of a single cell embodiment of the instant invention prior to filling with fluid.
FIG. 4a illustrates an end view of a single cell embodiment of the instant invention after filling with fluid.
FIG. 4b illustrates a side view of a single cell embodiment of the instant invention after filling with fluid.
FIG. 5 illustrates a perspective view of a single cell embodiment of the instant invention after filling with fluid.

Referring to FIGS. 2, 3a and 3b, a hydraulic load cell element 15 is formed from a pair of plates or sheets of semi-rigid material forming a top 19 and a base 17 thereof. The material is preferably one which can be stamped and fusion sealed, and which has sufficient ductility so that the planar surfaces can be deformed relatively easily by fluid pressure, which is resistant to chemical attack by the sensing fluid, and which is relatively inexpensive. Examples of suitable materials include steel and thermoplastic materials such as polyethylene, polypropylene, vinyl, nylon, polystyrene, cellulose acetate, polybutylene, PVC and CPVC, depending upon the particular sensing fluid. An interconnecting seal 202 connects the top 19 and base 17 proximate to or along the perimeter of the hydraulic load cell element 15. The interconnecting seal 202 can be formed by a variety of processes known to one of ordinary skill in the art, including but not limited to fusion welding; brazing; soldering; solvent welding; thermal welding; sonic welding; adhesive bonding; or spot welding, fastening, or clamping in conjunction with a mechanical seal such as an O-ring or sealant. A sensing port 16 in fluid communication with the sealed area bounded by the interconnecting seal 202 is sealably connected to the top 19 and base 17. Alternately, the hydraulic load cell element 15 can be formed as a single component, for example by blow-molding a thermoplastic material.

For example, the hydraulic load cell element 15 may be constructed by punching or shearing the top 19 and base 17 from steel strips, forming by stamping an interface 204 for the sensing port, assembling the top 19, base 17 and sensing port 16 tube, and then forming an interconnecting seal 202 by welding or brazing, thereby bonding and sealing the aforementioned elements to one another along the perimeter of the hydraulic load cell element 15.

The hydraulic load cell element 15 is then made operative by injecting a liquid, grease, Bingham fluid or thixotropic material into the sensing port 16 with sufficient pressure to cause the top 19 and base 17 to bulge, and preferably thereby undergo plastic deformation so that following the release of pressure the hydraulic load cell element 15 retains an expanded shape as illustrated in FIGS. 4a, 4b, and 5, thereby comprising a sealed cavity containing a sensing fluid. For example, one class of suitable sensing fluids would include silicone based liquids or greases, which exhibit relatively consistent fluid properties over the range of temperatures and pressures expected in an automotive environment. With the sensing port 16 connected to a differential pressure sensor 20 as illustrated in FIG. 1, a compressive load applied across the top 19 and base 17 of the hydraulic load cell element 15 causes the differential pressure DP between the sensing fluid and the atmosphere to increase responsive to the magnitude W of the compressive load proportional to the projected area A of the base 17 which is in contact with the sensing fluid, or:

$$W = DP \cdot A + \delta \quad (1)$$

where δ represents the effect of residual loads and pressure acting upon or within the system.

Absent the sensing fluid, the amount of force required to flatten the base 17 and top 19 is relatively small. Furthermore, in view of the relative incompressibility of the sensing fluid, the deflection of the base 17 and top 19 is insubstantial for the range of loads applied to the hydraulic load cell element 15, so that equation (1) is relatively unaffected by the effects of the mechanical stiffness and deflection of either the base 17 or the top 19.

By the incorporation of either a grease, Bingham fluid or thixotropic material as the sensing fluid within the cavity of the hydraulic load cell element 15 the orientation thereof has a relatively small effect on the differential pressure signal. More particularly, a Bingham fluid, also known as a Bingham plastic, acts as a solid when the shear stress therein are below a threshold, and acts a Newtonian fluid otherwise. Furthermore, a material such as grease attaches to the inside surfaces of the hydraulic load cell element 15 and does not flow in response to a change in the orientation thereof. Therefore, the differential pressure signal from a hydraulic load cell element 15 incorporating such a sensing fluid and incorporated in a vehicle seat would be relatively insensitive to the orientation of the seat.

The hydraulic load cell element 15 incorporated in a hydraulic hydrostatic weight sensor 10 must have sufficient flexibility so as to conform to the profile of the seat responsive to loading by the occupant. A single load element constructed in accordance with FIGS. 1–5 and of sufficient area to serve as a seat weight sensor would be relatively stiff in bending because of the expanded shape of the single hydraulic load cell element 15.

Figure 6:
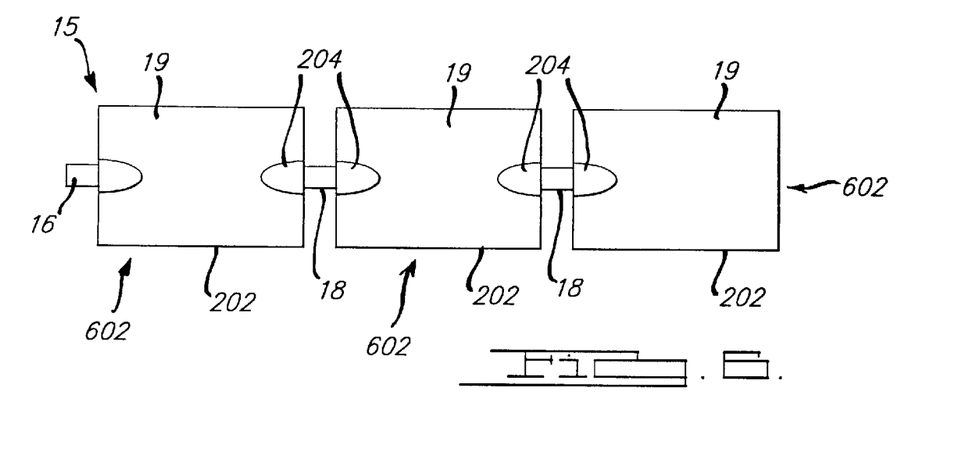
FIG. 6 illustrates a plan view multi-cell embodiment of the instant invention comprising a string of interconnected single cell embodiments.

Referring to FIG. 6, a hydraulic load cell element 15 with improved flexibility comprises a plurality of cells 602 in constructed in accordance with the FIGS. 1–5 and in fluid communication with one another via pressure distribution ports 18. A load applied across the top surfaces 19 of the individual cells 602 increases the pressure of the sensing fluid within the hydraulic load cell element 15 in accordance with equation (1), where DP is the pressure differential pressure between the sensing port 16 and the atmosphere 25, and A is the composite projected area of all cells 602. The pressure distribution ports 18 provide a means for the hydraulic load cell element 15 to flex and thereby conform to the contour of the seat cushion and spring when incorporated into a seat.

Figure 7A:
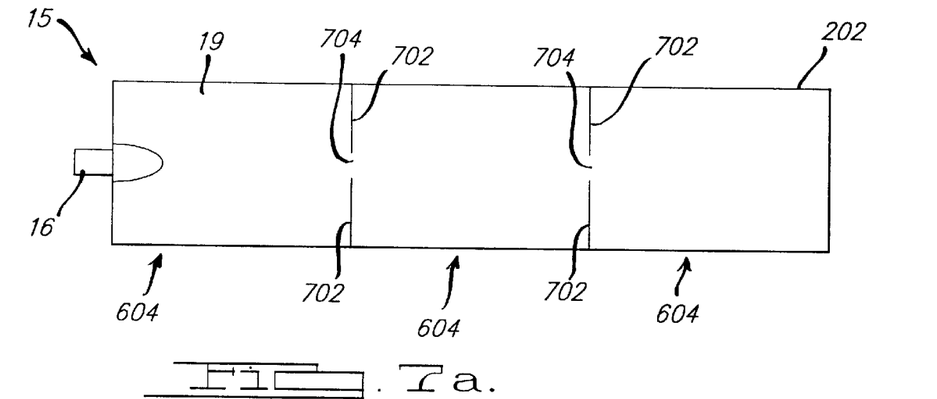
FIG. 7a illustrates a plan view of a multi-cell embodiment of the instant invention incorporating unitary construction.
Figure 7B:
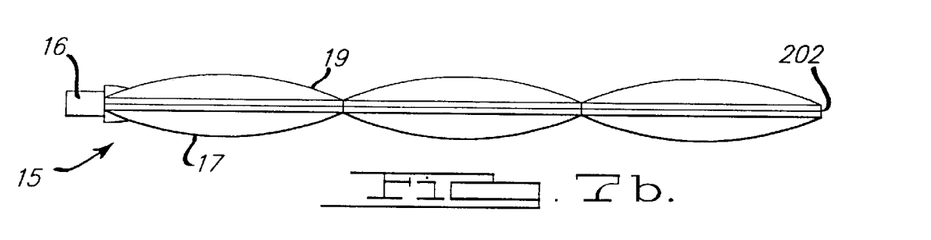
FIG. 7b illustrates a side view of a multi-cell embodiment of the instant invention incorporating unitary construction.

FIGS. 7a and 7b illustrate an alternate embodiment of a hydraulic load cell element 15 with improved flexibility incorporating unitary construction, wherein the top 19 and base 17 of the hydraulic load cell element 15 comprise continuous sheets or plates of semi-rigid material. The top 19 and base 17 are sealably connected to one another with an interconnecting seal 202 extending along and proximate to the perimeter of the hydraulic load cell element 15. The top 19 and base 17 are further attached to one another along seams 702, for example with spot welds or brazing joints. The seams 702 divide the hydraulic load cell element 15 into a plurality of cells 604 in fluid communication with one another via pressure distribution ports 704. The hydraulic load cell element 15 is made operative by injecting a liquid, grease, Bingham fluid or thixotropic material therein, for example through the sensing port 16, with sufficient pressure to cause the top 19 and base 17 to bulge, and preferably thereby undergo plastic deformation so that following the release of pressure the hydraulic load cell element 15 retains an expanded shape as illustrated in FIG. 7a, whereby the seams 702 act as hinges which enable the hydraulic load cell element 15 to flex.

Figure 8:
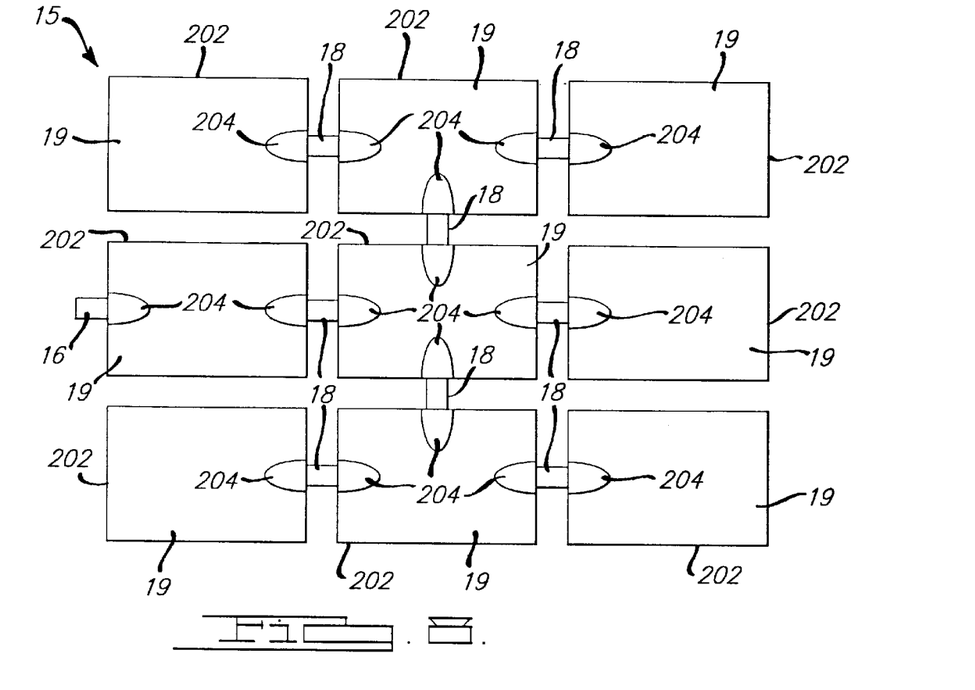
FIG. 8 illustrates a plan view of a multi-cell embodiment of the instant invention comprising an array of interconnected single cell embodiments.
Figure 9:
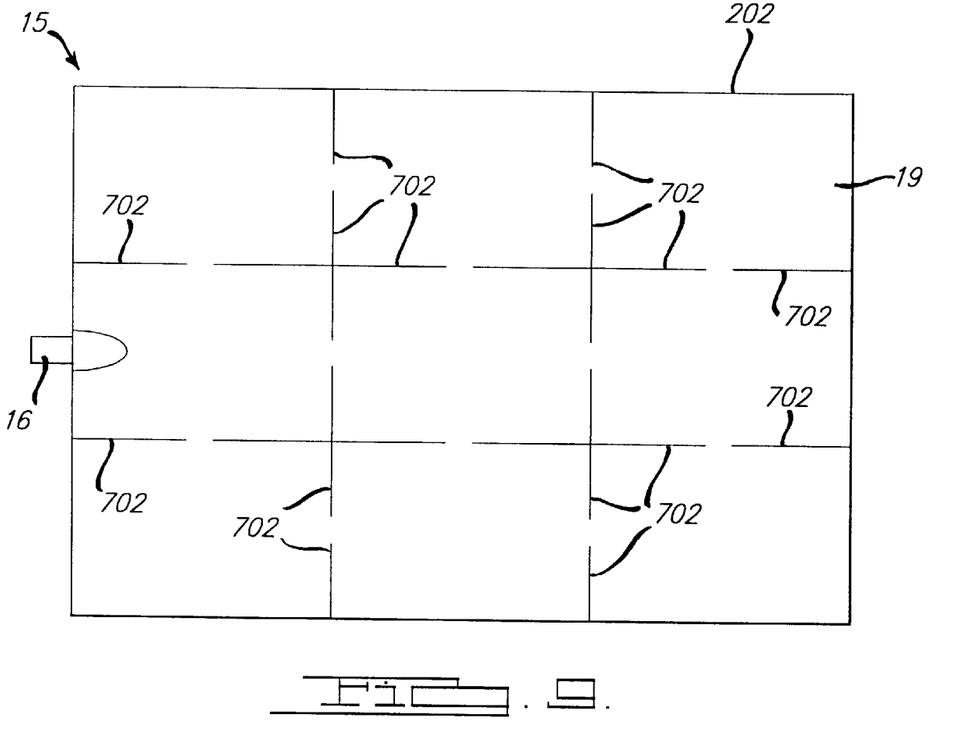
FIG. 9 illustrates a plan view of a multi-cell embodiment of the instant invention incorporating unitary construction.

FIGS. 8 and 9 illustrate embodiments which provide a hydraulic load cell element 15 with an array of cells which provide for flexibility in two dimensions. The two dimensional embodiment of FIGS. 8 and 9 respectively are similar to the one dimensional embodiments of FIGS. 6 and 7 respectively.

One of ordinary skill in the art sill appreciate that the hydraulic load cell element 15 of embodiments illustrated in FIGS. 6–9 can also be formed as a single component, for example by blow-molding a thermoplastic material.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A sensor for sensing the weight of an occupant on a vehicle seat, comprising:
    a. a first bladder constructed from a plurality of sheets of semi-rigid material sealably connected at the periphery thereof so as to form an enclosed first volume, whereby said first bladder is mountable beneath a cushion of the seat and supportable by a base of the seat;
    b. a fluid contained by said first bladder;
    c. a pressure sensor operatively coupled to said first bladder for generating a signal responsive to the pressure of said fluid within said first bladder; and
    d. a signal processor for calculating the weight of the occupant from said signal.

2. A sensor for sensing the weight of an occupant on a vehicle seat as recited in claim 1, further comprising a one or more bladders each constructed from a plurality of sheets of semi-rigid material sealably connected at the periphery so as to form an associated enclosed volume, wherein said one or more bladders are in fluid communication with said first bladder and are mounted beneath the cushion of the seat and supported by the base of the seat.

3. A sensor for sensing the weight of an occupant on a vehicle seat as recited in claim 1, wherein said sheets of semi-rigid material are secured to one another at a plurality of locations within said periphery so as to create a plurality of fluid containing zones in fluid communication with one another.

4. A sensor for sensing the weight of an occupant on a vehicle seat as recited in claim 3, wherein said plurality of locations at which said sheets of semi-rigid material are secured to one another enable said fluid containing zones to hinge with respect to one another.

5. A sensor for sensing the weight of an occupant on a vehicle seat as recited in claim 4, wherein said pressure sensor is in fluid communication with the fluid in said first bladder, said pressure sensor is responsive to the difference in pressure between the pressure of the fluid within said bladder and the ambient atmospheric pressure, and said fluid is selected from the group consisting of a liquid, a Bingham plastic and a thixotropic material.

6. A sensor for sensing the weight of an occupant on a vehicle seat as recited in claim 1, wherein said fluid is a liquid.

7. A sensor for sensing the weight of an occupant on a vehicle seat as recited in claim 1, wherein said fluid is selected from the group consisting of a Bingham plastic and a thixotropic material.

8. A sensor for sensing the weight of an occupant on a vehicle seat as recited in claim 1, wherein said pressure sensor is responsive to the difference in pressure between the pressure of the fluid within said first bladder and the ambient atmospheric pressure.

9. A sensor for sensing the weight of an occupant on a vehicle seat as recited in claim 1, wherein said pressure sensor is responsive to the strain in the surface of said first bladder.

10. A sensor for sensing the weight of an occupant on a vehicle seat as recited in claim 1, wherein said pressure sensor is in fluid communication with the fluid in said first bladder.

11. A system for sensing the weight of an occupant on a vehicle seat and for controlling a safety restraint system responsive thereto, comprising:
   a. a bladder constructed from a plurality of sheets of semi-rigid material sealably connected at the periphery thereof so as to form an enclosed volume, whereby said bladder is mountable beneath a cushion of the seat and supportable by the base of a seat;
   b. a fluid contained by said bladder;
   c. a pressure sensor operatively coupled to said bladder for generating a signal responsive to the pressure of said fluid within said bladder; and
   d. a signal processor for calculating the weight of the occupant from said signal for generating a control signal for controlling the safety restraint system responsive to said weight measurement.

12. A method of manufacturing a hydrostatic weight sensor, comprising:
   a. sealably connecting a plurality of sheets of semi-rigid material at the periphery of an area so as to form a first bladder;
   b. filling said first bladder with a fluid so as to cause a deformation of said sheets of semi-rigid material; and
   c. operatively connecting a pressure sensor to said bladder so as to sense the pressure of said fluid contained therein.

13. A method of manufacturing a hydrostatic weight sensor as recited in claim 12, further comprising the operations of:
   a. forming one or more bladders, each constructed from a plurality of sheets of semi-rigid material sealably connected at the periphery of a respective area, wherein said one or more bladders are in fluid communication with said first bladder; and
   b. filling said one or more bladders with a fluid so as to cause a deformation of respective said sheets of semi-rigid material.

14. A method of manufacturing a hydrostatic weight sensor as recited in claim 12, further comprising the operation of securing said sheets of semi-rigid material are to one another at a plurality of locations within said periphery so as to create a plurality of fluid containing zones in fluid communication with one another.

15. A method of manufacturing a hydrostatic weight sensor as recited in claim 14, wherein said plurality of locations at which said sheets of semi-rigid material are secured to one another enable said fluid containing zones to hinge with respect to one another.

16. A method of manufacturing a hydrostatic weight sensor as recited in claim 15, wherein said pressure sensor is in fluid communication with the fluid in said first bladder, said pressure sensor is responsive to the difference in pressure between the pressure of the fluid within said first bladder and the ambient atmospheric pressure, and said fluid is selected from the group consisting of a liquid, a Bingham plastic and a thixotropic material.

17. A method of manufacturing a hydrostatic weight sensor as recited in claim 12, wherein said fluid is a liquid.

18. A method of manufacturing a hydrostatic weight sensor as recited in claim 12, wherein said fluid is selected from the group consisting of a Bingham plastic and a thixotropic material.

19. A method of manufacturing a hydrostatic weight sensor as recited in claim 12, wherein said pressure sensor is responsive to the difference in pressure between the pressure of the fluid within said first bladder and the ambient atmospheric pressure.

20. A method of manufacturing a hydrostatic weight sensor as recited in claim 12, wherein said pressure sensor is responsive to the strain in the surface of said first bladder.

21. A method of manufacturing a hydrostatic weight sensor as recited in claim 12, wherein said pressure sensor is in fluid communication with the fluid in said first bladder.

* * * * *